W. A. DOBLE.
SPRING.
APPLICATION FILED SEPT. 30, 1908.

1,076,961.

Patented Oct. 28, 1913.

Witnesses
J. G. Hinkel
J. J. McCarthy

Inventor
William A Doble
By
Foster, Freeman, Watson & Coit
Attorneys

UNITED STATES PATENT OFFICE.

WILLIAM A. DOBLE, OF SAN FRANCISCO, CALIFORNIA, ASSIGNOR TO MARY E. DOBLE, OF SAN FRANCISCO, CALIFORNIA.

SPRING.

1,076,961.  Specification of Letters Patent.  Patented Oct. 28, 1913.

Application filed September 30, 1908. Serial No. 455,513.

*To all whom it may concern:*

Be it known that I, WILLIAM A. DOBLE, a citizen of the United States, residing at San Francisco, in the county of San Francisco and State of California, have invented certain new and useful Improvements in Springs, of which the following is a specification.

This invention relates to springs and has particular reference to the leaf springs used upon motor vehicles and other vehicles. It is necessary to use fastening means for attaching together and in place the superimposed leaves making up a leaf spring, and to properly hold the parts in place it is customary to cut away a portion of the leaves to receive the fastening means. This cutaway portion is sometimes in the shape of a hole through the leaves and sometimes in the shape of a notch or notches in the edges of the leaves. These cutaway portions are ordinarily made circular in outline, and it has been found in practice that springs which are subjected to such strains as break them will nearly always break upon a line across the leaf at a point where this cutaway portion occurs. This breaking of the spring is quite common and the object of my invention is to provide a structure which will reduce very materially the liability to such breaking. It is a fact that if a spring is materially weaker at one definite line across it it is much more liable to break at that point than it would be if the entire spring had the same strength as that which it has at the weakest point. In other words the tendency is for all of the bending to occur at the weakest point and this concentration of the bending breaks the spring.

My invention is designed to avoid any one weakest line across the spring and to thereby distribute the bending over a greater distance. This lessens very materially the danger of breaking the spring under unusual strains.

The novel features and advantages of my invention will be understood from the following description taken in connection with the drawings.

Figure 1:
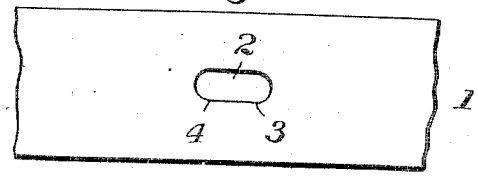
Figure 2:
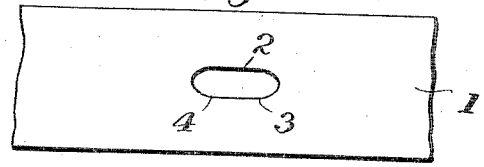
Figure 3:
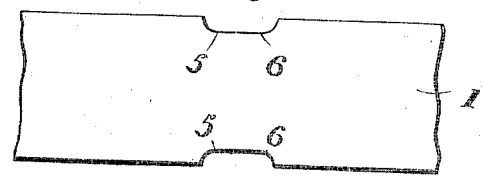
Figure 4:
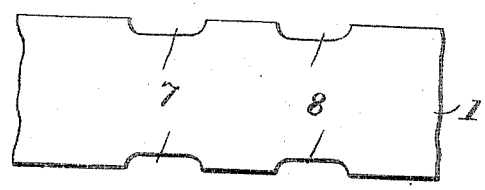
Figure 5:
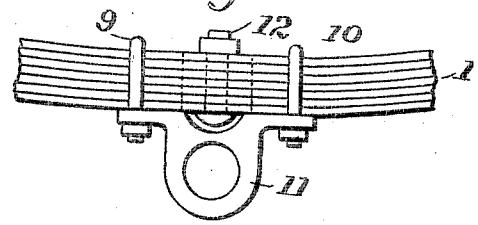

In the accompanying drawings,—Figure 1 is a plan view of a leaf spring embodying my invention; Figs. 2, 3 and 4 are plan views showing modified forms; and Fig. 5 is a side view of a leaf spring embodying the invention.

In Fig. 1 I have shown the ordinary leaf spring 1 provided with a bolt hole 2, and it will be observed from the drawing that the bolt hole 2 is not made circular in outline, but is provided with straight sides and rounded ends. Where the bolt hole is made circular in form there will be a single straight line across the spring upon which the spring is weaker than at any other point throughout its length, and therefore any bending will tend to take place on this line, thereby tending to break the spring. By making the bolt hole 2 with straight sides longitudinally of the spring for some distance there will be no single line across the spring which is weaker than other points, but on the other hand there will be a weakened portion of the spring throughout the full length of the straight sides of the opening 2, and thus any tendency to bend will be taken up not by one point, but by the entire part of the spring between the points marked 3 and 4 in Fig. 1. It has been found that this slight distribution of the bending strain has a remarkable effect in preventing the breaking of the springs.

In Fig. 2 I have shown a form of the invention similar to that disclosed in Fig. 1 excepting that the ends of the bolt hole 2 are made ellipsoidal instead of circular, and it will be understood that the particular shape of the ends of the hole is not material.

It will be understood that the best results are secured when the sides of the hole are parallel with the sides of the spring, but that absolute parallelism is not necessary. Some of the advantages of my invention will be secured by any such lengthening of the hole compared to its breadth as will serve to distribute the strain and prevent too great bending at a single line across the spring. This lengthening of the hole makes the change in the cross sectional area more gradual than where a circular hole is used.

Where the fastening means does not consist of a bolt but of a yoke passing over the sides of the spring entering notches on the sides, the notches should be made as shown in Fig. 3 having straight sides between the points 5 and 6 parallel with the sides of the spring leaf. If these notches were made circular as is common there would be a single line produced, across the spring weaker than any other point of the spring, and the objections above indicated would result. Where two yokes are to be used as the securing means, two sets of notches 7 and 8 are cut in the sides of the spring, as shown in Fig. 4, and in this instance the notches are made with straight sides parallel to the sides of the spring, as above indicated. In Fig. 5 I have shown the yokes 9 and 10 passing over the sides of the spring and securing it to the casting 11 which is carried by the axle of the vehicle. In this instance I have also shown the bolt 12 passing through the spring.

It will be understood that the spring is secured to the axle by the bolt or the yoke in the usual way and that the particular connection between the bolt, yoke and axle forms no part of the present invention.

It will be understood that modifications of the structure shown may be made without departing from the spirit of my invention.

Having thus described the invention, what is claimed is:

1. A leaf spring having a bolt hole therethrough at its central part having straight sides longitudinally of the leaf for an appreciable distance.

2. A leaf spring having a bolt hole therethrough at its central part of greater length longitudinally of the leaf than breadth, the said hole having sides parallel for some distance with the sides of the leaf.

3. A leaf spring having a bolt hole therethrough at its central part provided with straight sides parallel with the sides of the leaf and with rounded ends.

4. A spring for vehicles made up of superimposed leaves having a bolt hole therethrough at its center having straight side portions longitudinally of the spring.

5. A leaf spring having a cutaway portion to receive fastening means at its center the said cutaway portion having greater length longitudinally of the leaf than breadth.

6. A leaf spring having an elongated bolt hole therethrough at its center the major axis of which is in the direction of the length of the leaf and the minor axis is across the leaf.

In testimony whereof I affix my signature in presence of two witnesses.

WILLIAM A. DOBLE.

Witnesses:
ARTHUR M. LUCAS,
J. C. SUTGEN.